UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

DEPOLARIZING BATTERY-ELECTRODE AND PROCESS OF MAKING SAME.

1,375,647. Specification of Letters Patent. Patented Apr. 19, 1921.

No Drawing. Application filed August 22, 1918. Serial No. 251,029.

*To all whom it may concern:*

Be it known that we, RAYMOND C. BENNER and HARRY F. FRENCH, citizens of the United States, and residents of Fremont, in the county of Sandusky and State of Ohio, have invented a certain new and useful Improvement in Depolarizing Battery-Electrodes and Processes of Making Same, of which the following is a full, clear, and exact description.

This invention relates to a process of preparing depolarizers for electric batteries and more particularly to copper oxid depolarizers used in the zinc alkaline type of cell.

It has been found that the voltage of the copper oxid cell of the type referred to can be materially increased by adding sulfur, sulfids or other sulfur-containing material as described in the patent of Raymond W. Erwin patented Oct. 22, 1918 No. 1,282,057, and in our copending application filed Jan. 26, 1917, Serial No. 144,618. We have found that the voltage raise, due to the sulfur or sulfur-containing material, can be increased by a special process of preparing the depolarizer. This process, which is in part an electrolytic one, will now be described.

We use an electrolyte of sodium chlorid with copper electrodes, and pass a current through the electrolytic cell to precipitate cuprous oxid ($Cu_2O$) at the cathode.

The concentration of the sodium chlorid electrolyte and the current density can be varied without materially affecting results, but we have found that a satisfactory concentration of electrolyte is about 25% of sodium chlorid, and a suitable current density is in the neighborhood of 50 amperes per sq. ft. of anode surface.

The cuprous oxid accumulating on the cathode is scraped off from time to time and permitted to collect at the bottom of the electrolytic cell. When sufficient deposit has been obtained it is taken out and washed substantially free of sodium chlorid solution and is then oxidized in the air to cupric oxid. We have tried various temperatures of reoxidizing the cuprous oxid, from room temperature up to 875° C., all of which are successful as far as the final product is concerned. At room temperatures, however, the oxidation is too slow to be practically satisfactory unless moistened with water or sodium hydroxid solution. The higher the temperature of oxidation, the less is the advantage in adding the solution, until finally at a temperature of 700° to 875° C., no moistening with water or sodium hydroxid is necessary.

After the electrolytically prepared cuprous oxid has been oxidized to cupric oxid, from 1 to 3% sulfur is added to produce the high voltage effect previously referred to. Preferably the mixture is stirred and heated sufficiently to melt the sulfur and cause it to adhere to the oxid particles.

When a depolarizer has been prepared in this way and placed in a cell consisting of a perforated tinned iron container in a sodium hydroxid electrolyte with a zinc electrode, the average voltage throughout the life of the cell is about 14% higher than the voltage produced in a cell having commercial scale oxid mixed with sulfur or sulfur material, the life being computed on one ampere continuous test down to .5 volt. Since the ordinary cupric oxid, when mixed with sulfur or sulfur material, as described in the prior applications referred to, produces a very substantial increase in voltage over the ordinary copper oxid cell, it will be apparent that our improved process of forming a battery depolarizer is of great commercial importance.

It has also been found that when a battery is made of ordinary commercial cupric oxid and sulfur the voltage fluctuates at low atmospheric temperatures. With the depolarizer made by our improved process the critical temperature at which fluctuation in voltage is liable to commence is lowered over 20° C., for some reason that at present is not known, the critical temperature of the improved depolarizer being in the neighborhood of —4° C. Inasmuch as the copper oxid type of cell, which is chiefly used in railway work, is rarely subjected to a temperature below 0° C. in practice, it will be evident that the depolarizer made by the improved process is of decided commercial importance.

It will be understood that various changes may be made in our process without departing from the spirit of the invention. For instance, the sulfur may be mixed with the cuprous oxid before the air oxidation, if the temperature is not raised much above 200° C. Above 250° C. the sulfur or sulfur material should be added after the oxidation, to prevent the chemical combination between the two materials for the formation of sulfate or the reduction of the cuprous oxid to metallic copper with the formation of sulfur dioxid.

The production of cuprous oxid is not a necessary or limiting step in the process. We have used other electrolytes, such as copper sulfate, to produce cupric oxid CuO, which has all the previously described characteristics when mixed with sulfur or sulfur material and used in a copper oxid type of cell. The electrolytic formation of cuprous oxid, however, has the advantage over the cupric oxid process by virtue of the fact that it moves twice as much copper per ampere-hour.

Various amounts of sulfur or sulfur material may be mixed with the cupric oxid to produce the high voltage effect, as mentioned in the prior applications above referred to, but a satisfactory average proportion for practical purposes will be about 1.2%.

Having described our invention, what we claim is:

1. The process of preparing a high voltage depolarizer for electric batteries, which consists in oxidizing copper by electrolysis and mixing sulfur with the resulting oxid.

2. The process of preparing a high voltage depolarizer for electric batteries, which consists in producing cuprous oxid by electrolysis, oxidizing the cuprous oxid to cupric oxid and adding sulfur.

3. A depolarizing electrode for electric batteries containing an oxidized copper compound derived from electrolytic cuprous oxid, and sulfur.

In testimony whereof, we hereunto affix our signatures.

RAYMOND C. BENNER.
HARRY F. FRENCH.